July 7, 1964

H. SKJØDT ETAL 3,140,414

COMMUTATORS

Filed Jan. 23, 1962

2 Sheets-Sheet 1

INVENTORS
HOLGER SKJØDT
KAJ JENS PETER BOISEN

BY Dicke and Craig

ATTORNEYS

July 7, 1964   H. SKJØDT ETAL   3,140,414
COMMUTATORS
Filed Jan. 23, 1962   2 Sheets-Sheet 2

INVENTORS
HOLGER SKJØDT
KAJ JENS PETER BOISEN
BY Dicke and Craig
ATTORNEYS

United States Patent Office 3,140,414
Patented July 7, 1964

3,140,414
COMMUTATORS
Holger Skjødt and Kaj Jens P. Boisen, both of Odense, Denmark, assignors to Skjødt & Boisen Kommutatorfabrik A/S, Odense, Denmark, a corporation of Denmark
Filed Jan. 23, 1962, Ser. No. 168,212
Claims priority, application Great Britain Jan. 23, 1961
12 Claims. (Cl. 310—235)

The present invention relates to commutators for dynamo-electric machines and the method of manufacturing such commutators.

It is an object of the invention to provide an improved commutator for electric machines.

It is a further object of the invention to provide a simple and cheap commutator structure.

It is still a further purpose of the invention to provide a commutator structure which is designed for mass production technique.

It is still a further purpose of the invention to provide a commutator structure in which the exterior member can be made from a flat workpiece which is forced to form a generally cylindrical member.

It is still a further purpose of the invention to provide a commutator structure having a plurality of conductive segments provided with inwardly extending anchoring means embedded in an insulating interior core which will be able to stand the standard test of the automotive industry for commutators.

It is still a further purpose of the invention to provide a method of making a commutator from a flat workpiece to be formed into a tubular shell to receive an insulating core material to which the shell can be firmly bonded and then severed into separate commutator bars.

Figure 1:
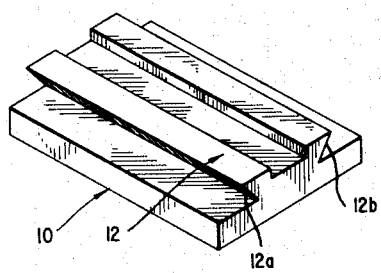
Figure 2:
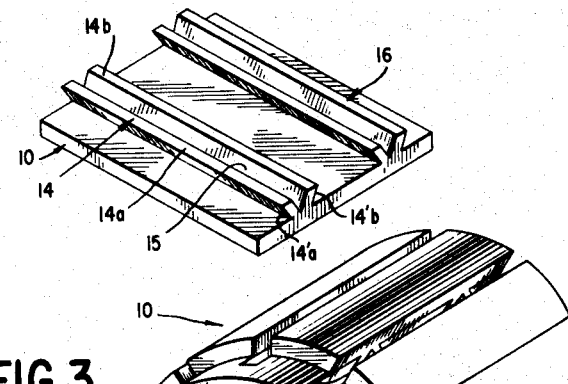
Figure 3:
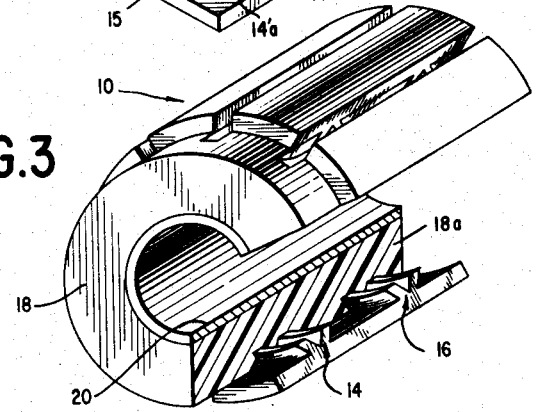
Figure 4:
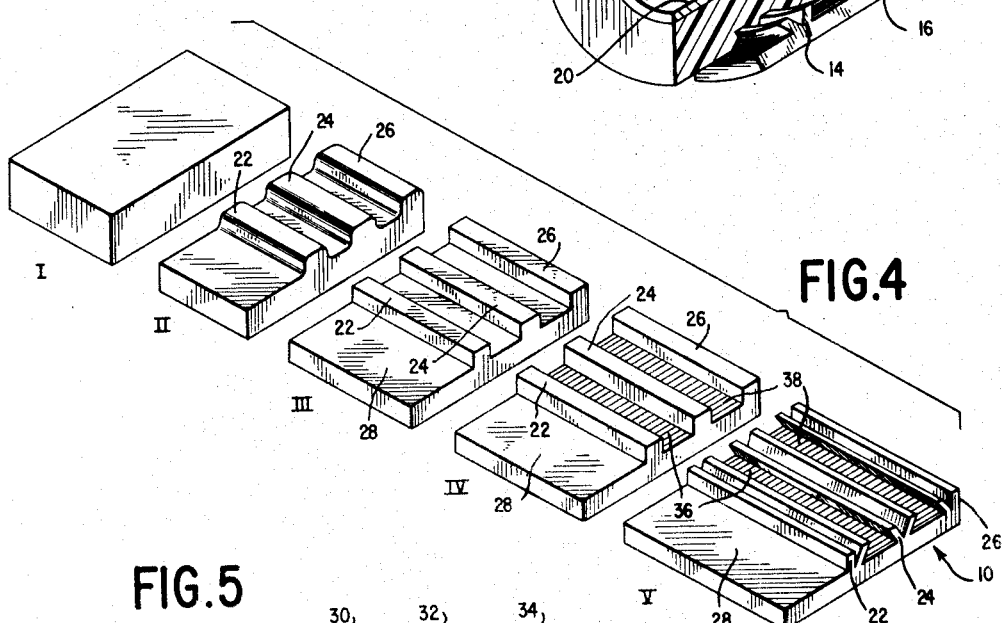
Figure 5:
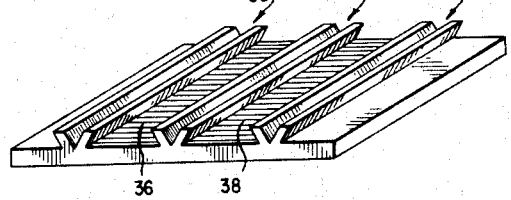
Figure 6:
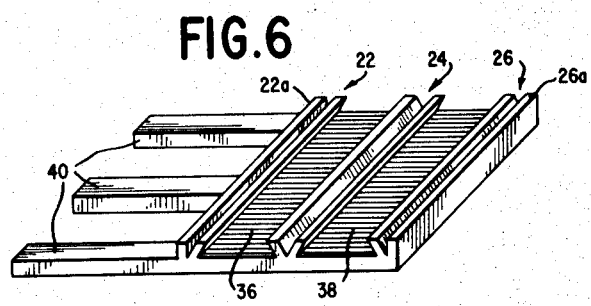
Figure 7:
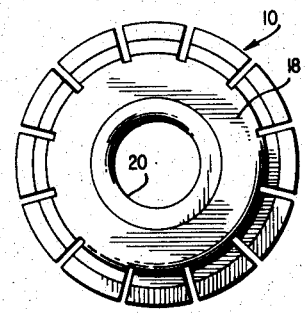
Figure 11:
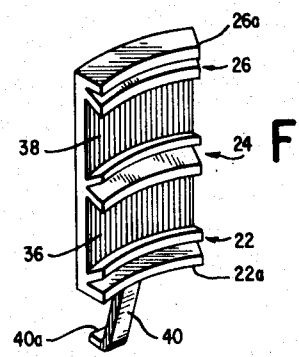
Figure 8:
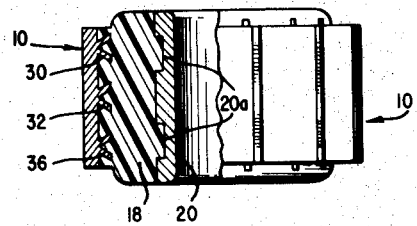
Figure 12:
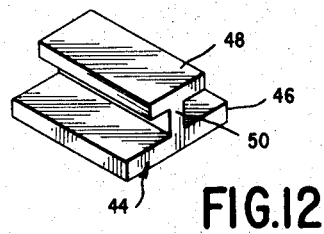
Figure 9:
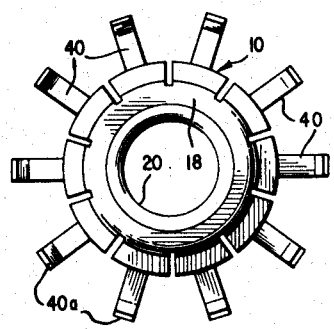
Figure 13:
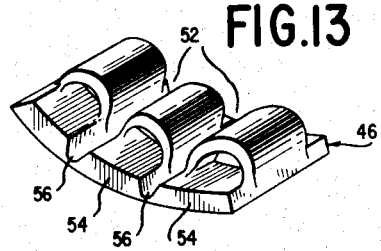
Figure 10:
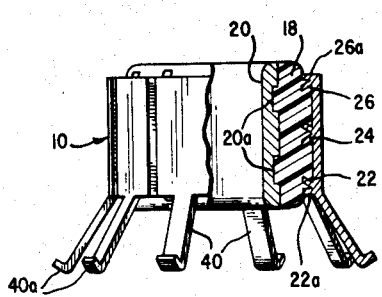

Further objects and advantages of the invention will appear from the following specification in connection with the accompanying drawing, in which FIGURE 1 is a perspective view of a part of a strip material for the manufacture of a commutator according to the invention, FIGURE 2 is a perspective view of a modified embodiment of the strip material shown in FIGURE 1, FIGURE 3 is a perspective view, partly in section of a commutator having segments made from the metal strip shown in FIGURE 2, FIGURE 4 is a perspective view illustrating stages of manufacture of strip material for a commutator according to the invention in a further modified embodiment, FIGURE 5 is a perspective view of a part of strip material for constructing a commutator according to the invention in still a further modified embodiment, FIGURE 6 is a part of the strip material shown in FIGURE 4 illustrating separated laterally extending lugs, FIGURE 7 is an end view of a commutator manufactured with an exterior shell made from the strip shown in FIGURE 5, FIGURE 8 is a side view partly in section through the commutator shown in FIGURE 7, FIGURE 9 is an end view of a commutator having an exterior shell made from strip material as shown in FIGURE 6, FIGURE 10 is a side view partly in section through the commutator shown in FIGURE 9, FIGURE 11 is a perspective view of a conductive segment of the commutator shown in FIGURES 9 and 10, FIGURE 12 is a further modified embodiment of a metal strip for manufacturing a commutator according to the invention, and FIGURE 13 is a perspective view of the strip shown in FIGURE 12 prepared for the manufacture of a commutator according to a modified embodiment of the invention.

In FIGURE 1 the end of an elongated strip 10 is shown adapted to be used for the construction of a commutator according to the invention to form an exterior shell which may be bonded to a core insulating material and then severed or cut into a number of desired commutator bars or segments.

To this purpose the strtip 10 which is of any electrical conductive material usually used for commutators such as a suitable copper or copper alloy is provided with one or preferably a plurality of elongated rib means as generally referred to by 12 in FIGURE 1 formed integral with the strip or sheet material 10. Hereby the strip comprises a body portion and the rib means 12 which extends from one surface of the body portion. As apparent from FIGURE 1 the rib 12 has continuous opposite surfaces 12a and 12b which extend parallel with the longitudinal direction of the strip body portion 10 and form an acute angle with its top surface whereby the inclined surfaces 12a and 12b are facing the top surface of the strip material 10.

The embodiment of the strip shown in FIGURE 2 differs from the embodiment shown in FIGURE 1 thereby that the top surface of the strip or sheet material 10 is provided with two elongated ribs 14 and 16 in spaced relationship, both being integral with the strip or sheet material and extending in parallel relationship and parallel to the lateral edges of the strip or sheet material.

As shown in FIGURE 2 the rib 14 is in the form of a double rib or split rib which comprises two elongated rib members 14a and 14b respectively separated by a V-shaped groove 15 whereby the two rib portions 14a and 14b form an acute angle with the top surface of the strip material 10 with inclined oppositely extending surfaces 14'a and 16'a. In a similar manner the rib 16 is in the form of a double rib or split rib.

The elongated strip with the continuous rib 12 or the ribs 14 and 16 or any other number of ribs formed integral therewith is preferably manufactured in continuous lengths in a manner to be more fully described in the following. In order to manufacture commutators from the strip, the strip is divided into portions, the lengths of which correspond to the periphery of the commutator. Each portion is thereafter forced, for example around a mandrel in a press, so as to form a generally cylindrical member or shell with the rib or ribs extending inwardly as annular ribs parallel with the ends of the shell. In the interior of the ring or shell a generally cylindrical core of insulating material is thereafter moulded, whereby the rib or ribs are embedded in the core body and provide anchoring means.

As core material a convenient synthetic resinous material may be used which is at first capable of flowing and thereafter sets to form a strong core body. As an example of core material a thermo-reactive phenolic resin with a heat-resistant filler, for example asbestos fibre, is mentioned.

When after setting of the core material the bonding of the shell to the core is completed the shell is severed or cut into the desired number of commutator bars or segments. It will be understood that the severing or cutting has to be made deep enough to electrically separate the commutator bars or segments, i.e., the cuttings must also extend through the anchoring ribs.

The structure of the commutator is illustrated in FIGURE 3 in which the core body generally referred to by 18 is cut away at 18a to illustrate the manner in which the ribs 14 and 16 are embedded in the core body to form anchoring members. FIGURE 3 also shows an interior bushing 20 moulded inside the core member 18. This bushing may be a metallic tubular member made on an automatic machine, preferably with annular grooves therein to prevent axial displacement of the bushing relatively to the core member, or the bushing may be of any other known structure.

As will be understood from FIGURE 3 the core material when moulded in the cylindrical shell will be distributed into the dovetail-like space between the inclined exterior surfaces of the double ribs and the inwardly facing surface of the strip or sheet material as well as into the V-shaped groove between the split rib portions. As will also be understood from the foregoing each commutator segment or bar has the interior ribs extending continuously as transverse ribs. It has been found that this structure provides a safe anchoring of the commutator bars and that a commutator structure is obtained which easily will stand the standard tests of the automative industry for commutators.

The elongated strip 10 may as illustrated in FIGURE 4 be manufactured in continuous lengths by drawing between rollers. FIGURE 4 illustrates the manufacture of a slightly modified embodiment of the strip for the manufacture of a commutator having associated with its bars or segments laterally extending lugs for the establishment of the electrical connection with the rotor winding of a dynamo-electric machine.

FIGURE 4 illustrates four steps of manufacturing a strip 10 having three integral ribs 22, 24, and 26, and a laterally extending portion 28. A relatively thick strip as illustrated at I with a thickness of for example 4–5 millimetres is drawn through five stations between pairs of rollers. The first station indicated at II provides a cross section with a plurality of ribs of curved cross section.

At station III the roller on the top side of the strip is designed to shape the ribs substantially in the desired height and rectangular cross section.

At station IV a swedging roller of the gear tooth type is used to impress cross grooves in the exposed top surface of the strip material 10 between the ribs, and eventually at station V a knife-type roller is used for dividing the ribs into two portions like the split ribs shown in FIGURE 2.

It will be understood that the technique illustrated by FIGURE 4 also can be used for providing a strip as shown in FIGURE 5 provided with three split ribs 30, 32 and 34, in similarity with the ribs 14 and 16 as shown in FIGURE 2, and with impressed rows of cross grooves 36 and 38 between the split ribs.

As an example of dimensions of a strip suitable for constructing a commuatator according to the invention the starting material may be in the form of a flat strip 10 millimetres wide and 5 millimetres thick, as shown at station I. At station II the strip may be rolled down to about 2.5 millimetres thickness and curved ribs on the top side of a height of approximately 1.5 millimetres and substantially the same width with a radius of curvature of between .7 and 1.25 millimetres. At station III the thickness of the strip is reduced to approximately 2 millimetres and the ribs are shaped in rectangular cross section with a height of approximately 1.1 millimetres and approximately the same width of 1.1 millimetres. The top of the tooth-like impressions provided at station IV may be separated approximately 1 millimetre.

In the final station V where the split ribs are provided the angle between the split rib portions may be of the magnitude 60°.

The commutator shown in FIGURES 7 and 8 is constructed from strip material as shown in FIGURE 5 and illustrates in the section shown in FIGURE 8 one of the commutator bars or segments with its body portion as formed by the sheet material 10 with the three split ribs 30, 32 and 34 embedded in the insulating core 18 in the interior of which the metallic bushing 20, shown in FIGURE 3, is secured. FIGURE 8 also illustrates the annular grooves 20a in the interior bushing for engagement with the core material to secure the bushing against axial displacement.

It will be appreciated that when the strip is drawn it is differentially workhardened during the drawing operation. The roller profiles and the degree of flowing of the material are regulated so as to finish with the desired hardness of the strip.

In the embodiment shown in FIGURE 4 the drawing is preferably so designed that the portion along which the ribs extend which is to form the brush track surface of the commutator is made harder than the marginal or laterally extending portion 28. By way of example the Brinell hardness may be about 60 at station I, increased to 95 at station II, increased to 108 at station III, increased further to 110 at station IV and terminate with 106 at station V, all with respect to the part of the strip which is provided with the ribs while at the laterally extending portion the Brinell hardness may be as low as 75, or even lower.

The desired length of a strip as shown at station V in FIGURE 4 is thereafter introduced in a stamping press by means of which lugs 40 as shown in FIGURE 6 are cut out from the laterally extending portion 28.

As will be appreciated from FIGURE 6 the design of the split ribs differs from FIGURE 5 therein that the two outer ribs only have the portions which face the middle rib 24 bent over the exposed strip surface which is provided with the tooth-impressions.

The strip shown in FIGURE 6 as in the case of the foregoing examples is bent round a former or mandrel to produce a cylindrical shell with the lugs 40 extending from one end thereof and the split rib extending inwardly to form substantially annular ribs.

The commutator constructed from a strip as shown in FIGURE 6 is illustrated in FIGURES 9 and 10. In FIGURE 10 is also shown that the ends 40a of the lug 40 are bent in a direction substantially perpendicular to the body portions of the lugs and that the lugs themselves are bent outwardly to form an obtuse angle with the axial direction of the commutator so as to form hook-like members which easily can be bent in over the commutator bars to receive the ends of the electrical wires extending from the winding of the dynamo-electric machine.

As will be appreciated from FIGURE 10 the exterior parts 22a and 26a of the exterior split ribs 22 and 26 are not embedded in the insulating core material but remain as exposed metallic end surfaces at each end of each of the commutator bars or segments, whereby a greater exposed metallic surface of each commutator bar is obtained. This provides for a better cooling and thereby using higher temperatures for providing electrical connection between the hook members 40, 40a and the wires so as to use welding or a similar high-temperature bonding process.

FIGURE 11 shows a perspective view of a segment of a commutator as shown in FIGURES 9 and 10. As will be appreciated from FIGURES 9 and 11 the severing of the exterior shell member is preferably provided in such a manner that the extending lugs or hooks are located substantially at the middle of each commutator bar or segment.

As will also be understood from FIGURE 11 the tooth-like impressions 36 and 38 which extend perpendicularly to the ribs 22, 24 and 26 contribute to holding the commutator bars or segments safely in peripheral direction.

According to the modification of the invention illustrated in FIGURES 12 and 13, the starting material is a strip 44 of substantially I-shaped cross section with one flange 46 which is to form the brush track surface being wider than the other flange 48 which is to form the anchoring members, the two flanges 48 and 46 being connected by a relatively narrow portion 50.

To manufacture the commutator the strip shown in FIGURE 12 is by means of substantially wedge-shaped impressions or grooves 52 made by a suitable stamping tool from the top side of the rib divided into a plurality of adjacently arranged segments 54 of approximately trapezoidal cross section with narrow bridge portions 56 left between the part of the impressions 52.

As apparent from FIGURE 13 the stamping of these impressions also results in deformation of the upper flange or rib 48 so as to provide cavities adjacent each end of the rib on each segment into which the core material can flow which results in a very firm grip of the ribs as anchoring elements in the core material.

If desired, the division of the strip into sections as illustrated in FIGURE 13 can be made in such a manner as to cause the connecting bridges 56 to be curved outwardly from the surface of the strip.

It will be understood that when the strip shown in FIGURE 13 is formed into a ring and the core material is moulded into the interior of the ring, the core material will also extend into the space between the segments as formed by the wedge-shaped impressions 52 as well as into the cavities formed at each end of the rib sections.

The bridges may then, in order to electrically separate the commutator segments or bars from each other be cut away on a hobber or alternatively the commutator may be turned on a lathe so as to remove an exterior layer which includes the bridge material.

It will be understood that it is also possible within the scope of the invention to divide strips according to any of the aforementioned embodiments by means of wedge-shaped impressions in transverse direction in the manner illustrated in FIGURE 13 prior to the bending of the strip to form a ring or exterior shell.

It will further be appreciated that in order to avoid cutting through the strip to a depth slightly inside the inwardly facing surfaces of the rib as described with reference to the embodiments according to FIGURES 1–11, it is possible before the moulding of the insulating body to remove the material between the ribs and, if desired, also partly to remove the material between the segments at the points where the final division of the segments has to be effectuated.

It will be understood that the method described which comprises the steps of constructing an elongated blank having elongated continuous ribs in transverse spaced relationship in the longitudinal direction of the blank and having opposite inclined surfaces which form an acute angle with the exposed surfaces of the strip between the ribs deforming the blank into a substantially cylindrical member with the ribs extending inwardly in the form of substantially continuous annular ribs, moulding the core in the cylindrical member to effectively anchor the ribs, and eventually severing the cylindrical member into the desired plurality of separated commutator bars saves a plurality of operation steps and avoids waste of material thereby that the ribs are formed integral with the strip material which can be made in continuous lengths.

It will be understood that the invention is not limited to produce the step material by drawing between rollers, and that it will be possible within the scope of the invention to produce the strip by extrusion or in any other convenient manner.

As a further example with reference to FIGURES 12 and 13 the dimensions of the strip may be a total width of the flange 46 of approximately 7 millimetres with a thickness of 2 millimetres, the portion 50 being 1 millimetre high and 1 millimetre wide, and the flange 48 being 1 millimetre thick and 3 millimetres wide.

It will further be appreciated that it is possible within the scope of the invention to combine the different embodiments shown and described, as well as to combine the method steps described and that also further modifications will be possible within the scope of the appended claims.

We claim:

1. In a commutator in combination: an insulating core member, a plurality of conductive segments each comprising a body portion and anchoring means embedded in said insulating interior core member, said body portion being of sheet material following a cylindrical curvature, and said anchoring means being in the form of rib means integral with said sheet material and extending transversely of said body portion and having opposite surfaces extending in peripheral direction and facing the interior curved surface of said sheet material.

2. In a commutator having an insulating core member in combination: a plurality of conductive segments each comprising a body portion and a plurality of rib means effectively embedded in said insulating core member to provide anchoring means, said body portions being of sheet material of substantially cylindrical configuration, said rib means being integral with said sheet material and of substantially the same cylindrical configuration and having continuous opposite surfaces forming an acute angle with the interior surface of said sheet material.

3. In a commutator having an insulating core member in combination: a plurality of conductive segments each comprising a body portion of cylindrically curved sheet material having side edges and end edges and a plurality of double ribs integral with said sheet material extending between said side edges of said segment substantially parallel with the edges thereof, said double ribs being effectively embedded in said insulating interior core member to provide anchoring means for said body portion, and each double rib having at least one rib portion including a surface which forms an acute angle with the interior curved surface of said sheet material.

4. In a commutator having an insulating core member in combination: a plurality of conductive segments each comprising a body portion of cylindrically curved sheet material having side edges and end edges, and a plurality of rib means integral with said sheet material and following substantially its cylindrical curvature, each rib means being in the form of a double rib extending transversely between the side edges of said body portion substantially parallel with its end edges and having portions bent in opposite directions forming acute angles with the interior curved surface of said sheet material.

5. In a commutator having an insulating core member in combination: a plurality of peripheral electrically separated members of electrical conductive material each having a body portion of cylindrically curved configuration and at its interior surface being provided with a plurality of transversely extending integral double-ribs following said cylindrical curvature and being provided with oppositely disposed portions forming acute angles with the interior surface of said body portion and being effectively embedded in said insulating material to anchor said member thereto.

6. A commutator having an insulating core member comprising: a plurality of electrically separated commutator bar members of electrical conductive material each comprising a body portion of cylindrically curved configuration having side edges and end edges and which at its interior surface is provided with transversely extending integral ribs following said cylindrical curvature and extending between said side edges of said body portion substantially parallel with said end edges thereof, each rib being in the form of oppositely disposed split rib members forming acute angles with the interior surface of said body portion, a plurality of tooth-like impressions in the interior surface of said body portion between said ribs extending substantially transversely to said ribs, said ribs and said tooth-like impressions being effectively bonded to said insulating core member in peripheral spaced relationship.

7. A commutator having an insulating core member comprising: a plurality of peripheral electrically separated segments of electrical conductive material each having a body portion of cylindrically curved configuration having side edges and end edges, transversely extending integral ribs at its interior surface extending between said side edges and being substantially parallel with said end edges, and an integral lug extending from one end edge, said ribs being in the form of double ribs having portions forming acute angles with the interior surface of said body portion and being effectively embedded in said insulating core to provide anchoring of said segments on said core.

8. As an article of manufacture for the construction of a commutator having a plurality of peripheral electrically separated bar means of electrical conductive material provided with anchoring means embedded in an insulating interior core: a strip of sheet material following a cylindrical curvature and having on its inwardly facing surface continuous rib means integral with said sheet material and following an annular path and having side surfaces forming an acute angle with the interior surface of said cylindrical member.

9. As an article of manufacture for the construction of a commutator having a plurality of peripheral electrically separated portions of electrical conductive material provided with anchoring means embedded in an insulating interior core: a strip of sheet material following a cylindrical curvature and having on its inwardly facing surface a plurality of elongated parallel ribs integral with said sheet material and following annular paths and having side surfaces forming an acute angle with the interior surface of said cylindrical member, and tooth-like impressions in the interior surface of said cylindrical strip between said ribs substantially perpendicular to said ribs.

10. As an article of manufacture for the construction of a commutator having a plurality of peripheral electrically separated portions of electrical conductive material provided with anchoring means embedded in an insulating interior core: a strip of sheet material following a cylindrical curvature and having on its inwardly facing surface a plurality of continuous parallel ribs integral with said sheet material and following annular paths, each rib being in the form of a double rib split substantially along its middle line and having at least one of its split portions provided with inclined side surfaces forming an acute angle with the interior surface of said cylindrical member.

11. As an article of manufacture for the construction of a commutator having a plurality of peripheral electrically separated portions of electrical conductive material provided with anchoring means embedded in an insulating interior core: a strip of sheet material following a cylindrical curvature and having on its inwardly facing surface a plurality of annular ribs integral with said sheet material, each rib being in the form of a double rib split substantially along its middle line and having at least one of its split portions bent to form an acute angle with the interior surface of said cylindrical member, and a plurality of integral lugs in peripheral spaced relationship extending from one end of said cylindrical member.

12. As an article of manufacture for the construction of a commutator having a plurality of peripheral electrically separated portions of electrical conductive material provided with anchoring means embedded in an insulating interior core: a strip of sheet material formed as an open-ended cylindrical member and having a plurality of integral lugs in spaced relationship extending from one end thereof, a plurality of annular double-ribs having parallel rib portions integral with said sheet material extending inwardly of said cylindrical member, each rib having at least one of its portions bent to form an acute angle with the interior surface of said cylindrical member, and tooth-like impressions in the interior surface of said sheet material between said ribs substantially perpendicular to said ribs.

References Cited in the file of this patent
FOREIGN PATENTS
176,251     Austria _____ Oct. 10, 1953